US012233608B2

(12) United States Patent
Chen et al.

(10) Patent No.: US 12,233,608 B2
(45) Date of Patent: Feb. 25, 2025

(54) APPARATUS FOR AUTOMATIC MANUFACTURING OF WIND TURBINE BLADES

(71) Applicant: Gurit Tooling (Taicang) Co., Ltd., Jiangsu (CN)

(72) Inventors: Binjiang Chen, Jiangsu (CN); Jialin Lu, Jiangsu (CN)

(73) Assignee: Gurit Tooling (Taicang) Co., Ltd., Jiangsu (CN)

( * ) Notice: Subject to any disclaimer, the term of this patent is extended or adjusted under 35 U.S.C. 154(b) by 343 days.

(21) Appl. No.: 17/640,542

(22) PCT Filed: Jul. 15, 2020

(86) PCT No.: PCT/CN2020/102166
§ 371 (c)(1),
(2) Date: Mar. 4, 2022

(87) PCT Pub. No.: WO2021/051979
PCT Pub. Date: Mar. 25, 2021

(65) Prior Publication Data
US 2022/0402219 A1    Dec. 22, 2022

(30) Foreign Application Priority Data

Sep. 16, 2019  (CN) .......................... 201921529020.2
Apr. 27, 2020  (CN) .......................... 202020670376.4

(51) Int. Cl.
*B29C 70/38*    (2006.01)
*B24B 19/14*    (2006.01)
(Continued)

(52) U.S. Cl.
CPC ............ *B29C 70/382* (2013.01); *B24B 19/14* (2013.01); *B29C 33/202* (2013.01); *B29C 70/541* (2013.01); *B29L 2031/085* (2013.01)

(58) Field of Classification Search
CPC ..... B29C 70/38; B29C 70/382; B29C 70/386; B29L 2031/085; B29D 99/0025;
(Continued)

(56) References Cited

U.S. PATENT DOCUMENTS 4,998,442 A * 3/1991 Brown .................... B25J 9/026
                                                    74/462
5,244,283 A * 9/1993 Morita .................. F16C 29/008
                                                    384/44
(Continued)

FOREIGN PATENT DOCUMENTS

CN          102438799 A      5/2012
CN          104093546 A      10/2014
(Continued)

OTHER PUBLICATIONS

International Preliminary Report on Patentabilty in related international application No. PCT/CN2020/102166 issued on Mar. 15, 2022.
(Continued)

*Primary Examiner* — Jerzi H Moreno Hernandez
(74) *Attorney, Agent, or Firm* — Polsinelli, P.C.

(57) ABSTRACT

An apparatus and method for the automatic manufacturing of wind turbine blades, including an elongate tool support (2) with a main suspension beam (4), a plurality of support frames (8) supporting the main suspension beam (4) above the wind turbine blade mould (1), an elongate guide rail (5) provided on the main suspension beam (4) so as to extend longitudinally along the main suspension beam (4), a slider base (6) slidably mounted on the guide rail (5), a drive mechanism (53) for driving the slider base (6) longitudinally along the guide rail (5) and a tool holder (7) mounted on the slider base (6). The apparatus/method improves the efficiency and accuracy of the blade manufacture, and also
(Continued)

reduces the exposure of the human body to harmful substances used in blade manufacture.

27 Claims, 5 Drawing Sheets

(51) Int. Cl.
    *B29C 33/20*     (2006.01)
    *B29C 70/54*     (2006.01)
    *B29L 31/08*     (2006.01)

(58) Field of Classification Search
    CPC ..... B29D 99/0028; Y02E 10/72; B24B 19/14; B25J 9/026
    See application file for complete search history.

(56) References Cited

U.S. PATENT DOCUMENTS

| | | | |
|---|---|---|---|
| 9,486,941 B2 | 11/2016 | Tapia et al. | |
| 10,040,255 B2 | 8/2018 | Schilsbye | |
| 10,099,324 B2 | 10/2018 | De Waal Malefijt | |
| 2011/0200276 A1* | 8/2011 | Bolzonaro | F16C 29/04 384/13 |
| 2011/0220378 A1* | 9/2011 | Numata | B24B 23/028 173/141 |
| 2012/0128810 A1 | 5/2012 | Arrizabalaga et al. | |
| 2012/0138218 A1 | 6/2012 | Dean et al. | |
| 2012/0205048 A1* | 8/2012 | Mironov | B29C 31/044 156/350 |
| 2015/0136305 A1 | 5/2015 | Ullmann et al. | |
| 2015/0224759 A1* | 8/2015 | Boon | B29C 70/38 156/324 |
| 2016/0176123 A1* | 6/2016 | Pedigo | B29C 70/382 264/258 |
| 2016/0354984 A1* | 12/2016 | Hedges | B29C 70/38 |
| 2019/0039332 A1* | 2/2019 | Nandipati | B29C 70/382 |
| 2019/0047139 A1* | 2/2019 | Doll | B25J 9/026 |
| 2020/0368970 A1* | 11/2020 | Georgeson | B29C 64/209 |

FOREIGN PATENT DOCUMENTS

| | | | |
|---|---|---|---|
| CN | 104272206 A | | 1/2015 |
| CN | 105246673 A | | 1/2016 |
| CN | 108483242 A | * | 9/2018 |
| WO | 2011/035539 A1 | | 3/2011 |
| WO | 2013-060336 A1 | | 5/2013 |

OTHER PUBLICATIONS

International Search Report and Written Opinion in related international application No. PCT/CN2020/102166 issued on Oct. 20, 2020.

Extended European Search Report in related EP Application No. 20864553.1 issued on Oct. 19, 2023.

* cited by examiner

APPARATUS FOR AUTOMATIC MANUFACTURING OF WIND TURBINE BLADES

FIELD OF THE INVENTION

This invention relates to the field of wind turbine blade manufacturing, in particular to an apparatus for the automatic manufacturing of wind turbine blades.

BACKGROUND

Wind energy, as a clean and renewable energy, has attracted more and more attention from all over the world. Wind energy reserves are huge. The global wind energy is about $2.74 \times 10^9$ MW, of which the available wind energy is $2 \times 10^7$ MW, which is 10 times larger than the total amount of water energy available on the earth. Wind has been used for a long time, mainly by pumping water and grinding flour through windmills. Now, people are interested in how to use wind to generate electricity. The principle of wind power generation is to use wind power to drive the wind turbine blades to rotate, and then to increase the speed of rotation through the accelerator to promote the generator to generate electricity. According to current wind power generation technologies, a wind speed of about three meters per second of breeze speed can start generating electricity. Because there is no fuel problem and no radiation or air pollution in wind power generation, wind power generation is becoming an upsurge in the world.

With the vigorous development of clean energy, the wind power industry has also developed rapidly. The megawatt level of wind turbine blades is getting larger and larger, and the length of wind turbine blades has been changed from more than 40 meters to more than 80 meters. As the length of a wind turbine blade is increasing, the length of its mould is also increasing. Currently, commercial wind turbine blades are manually produced, which not only has a low efficiency, but also poses a severe test on the health and safety of production personnel.

There have been prior proposals for the automatic production of wind turbine blades. WO-A-2011/035539 discloses a wind turbine blade automated production system, characterized in that the system comprising a fixed side mould, a turning side mould, at least a fixed side mould gantry transversely spanning over the fixed side mould and at least a turning side mould gantry transversely spanning over the turning side mould. Each gantry is supported on an outer track and an inner track, so that each gantry is slidable along the longitudinal direction of the moulds. The outer and inner tracks are supported on the floor and comprise parallel rails. The turning side mould is provided with a plurality of turnover hinge devices, and the inner track is provided with a plurality of gaps, the number and the position of which correspond to the number and the position of the turnover hinge devices. The inner track is arranged at such a height that the turnover hinge devices may rotate the turning side mould without any collision of the mould and the inner track. This automated production system suffers from the problem that it is bulky, complicated and expensive.

US-A-2012/0128810 discloses a system for the automatic manufacture of wind turbine blades in which plural gantry structures extends transversely over the die halves. The gantry structures are supported on the floor and are driven along the die halves. A first gantry structure supports, over the die halves, a first head-bearing means for selectively holding accessories for applying demolding agent, paint, or adhesive or a machining accessory, and a second gantry structure supports, over the die halves, a second head-bearing means for applying dry fiber mats. Again, this automated production system suffers from the problem that it is bulky, complicated and expensive.

Considering the above, there is a need in the art of wind turbine blade manufacture for an improved automated manufacturing apparatus for the automatic manufacture of wind turbine blades, which can be used for one or more manufacturing steps, for example spraying a surface coating into the mould, handling fibrous material, laying up the fibrous material into the mould, applying adhesive on the wind blade bonding line and web flange, and machining or grinding the moulded wind turbine blade. In particular, there is a need in the art of wind turbine blade manufacture for such an improved automated manufacturing device for the automatic manufacture of wind turbine blades which is less bulky, less complicated and less expensive than the known automatic manufacturing systems summarised above.

SUMMARY OF THE INVENTION

Purposes of the Invention:

In order to solve the shortcomings of the existing technology, the invention aims to provide an automatic manufacturing apparatus for wind turbine blades which can be used for one or more manufacturing steps, for example spraying a liquid into the mould, handling fibrous material, laying up the fibrous material into the mould, and machining or grinding the moulded wind turbine blade, and which is less bulky, less complicated and less expensive than known automatic manufacturing systems.

The invention aims to provide an automatic manufacturing apparatus for wind turbine blades which can replace the current commercial manual operation with a universal tool holder which can be fitted with a desired tool to carry out a desired function and can be quickly and accurately positioned and automatically manipulated at a desired location above the mould, thus realizing the automatic manufacturing of a wind turbine blade, which not only improves the efficiency and accuracy of wind turbine blade manufacturing, but also reduces the damage to the human body from harmful substances.

Solution:

In order to achieve the above purposes, the invention provides an apparatus for the automatic manufacturing of wind turbine blades, the apparatus comprising a tool support adapted to be mounted above a wind turbine blade mould, wherein the tool support is elongate in a longitudinal direction so as to extend longitudinally along at least a portion of a length of the wind turbine blade mould when the tool support is mounted above the wind turbine blade mould, wherein the elongate tool support comprises a main suspension beam which is elongate in the longitudinal direction, a plurality of support frames fitted to the main suspension beam for supporting the main suspension beam above the wind turbine blade mould, the plurality of support frames being provided as a series of support frames positioned along the length of the main suspension beam on opposite longitudinal sides of the main suspension beam, each support frame comprising a base mechanism adapted to be detachably fitted to the wind turbine blade mould, an elongate guide rail provided on the main suspension beam so as to extend longitudinally along the main suspension beam, a slider base slidably mounted on the guide rail, a drive mechanism for driving the slider base longitudinally along the guide rail and a tool holder mounted on the slider base.

In one embodiment of the apparatus of the invention, the main suspension beam comprises a pair of suspension beam members which are elongate in the longitudinal direction and spaced from each other in a direction transverse to the longitudinal direction, and the slider base comprises a central body and, on opposite sides of the central body, a pair of mount assemblies, each mount assembly being supported on a respective suspension beam member.

Preferably, the guide rail comprises a pair of first guide rail members, each first guide rail member being mounted on a respective suspension beam member, and each mount assembly comprises a respective first guide element which engages with a respective first guide rail member.

Typically, each first guide rail member is mounted on a longitudinally-extending side face of the respective suspension beam member, and each first guide element is mounted on a respective opposing side face of the slider base.

Optionally, the guide rail further comprises a pair of second guide rail members, each second guide rail member being mounted on a respective suspension beam member, and each mount assembly comprises a respective second guide element which engages with a respective second guide rail member, wherein each second guide rail member is parallel to and spaced from the first guide rail member which is mounted on the same respective suspension beam member as the said second guide rail member.

Each second guide rail member may be mounted on the longitudinally-extending side face of the respective suspension beam member, and each second guide element is mounted on the respective opposing side face of the slider base, wherein the first guide rail member and the second guide rail member mounted on the same respective suspension beam member and are vertically spaced from each other.

Typically, each mount assembly further comprises a respective movable support element which extends downwardly and movably engages an upwardly-oriented support surface on the respective suspension beam member. The movable support element may comprise a wheel.

Typically, the central body of the slider base comprises a lateral beam, and the tool holder is mounted on the central body by a transversely movable support which is configured to be movable along the lateral beam.

Preferably, the transversely movable support comprises a first drive device for driving the transversely movable support along the lateral beam.

Optionally, the transversely movable support comprises a mount, which is fitted to the lateral beam to be movable along the lateral beam, and an arm member which is fitted to the mount to be movable in a direction transverse to the lateral beam, wherein the arm member has a lower end to which the tool member is fitted.

Preferably, the transversely movable support comprises a second drive device for driving the arm member upwardly or downwardly relative to the lateral beam.

Optionally, the apparatus further comprises a controller for controlling the position of the tool member with respect to a three-dimensional co-ordinate system, by controlling the drive mechanism, the first drive device and the second drive device.

In an alternative embodiment of the apparatus of the invention, the main suspension beam has a "C" shaped cross-section with a downwardly-oriented opening thereby to define the guide rail.

In the alternative embodiments, the main suspension beam comprises an upper wall, two opposite side walls depending downwardly from the upper wall and two opposite flanges extending inwardly towards each other at opposite lower edges of the opposite side walls to define an elongate channel extending along a lower face of the main suspension beam and thereby to define the guide rail, and wherein the slider base is captively fitted in the channel for slidable movement therealong.

Preferably, in the alternative embodiment, the slider base has an outer cross-section which matches an outer cross-section of the channel.

In the embodiments of the invention, typically, the drive mechanism comprises a mechanical transmission fitted between the main suspension beam and the slider base and an electric motor coupled to the mechanical transmission. The mechanical transmission is, for example, a chain transmission, a gear transmission or a worm gear transmission. In some embodiments of the invention, a gear wheel or worm wheel arranged on the slider base respectively engages an elongate gear element or worm screw arranged on the main suspension beam, whereby rotation of the gear wheel or worm wheel under the action of the electric motor drives the slider base longitudinally along the guide rail.

Preferably, the electric motor incorporates a braking mechanism for automatically decelerating the slider base when the electric motor is switched from a powered state to an unpowered state.

In the preferred embodiments of the invention, the tool holder is adapted to be fitted with a mechanical manipulator device, a rotatable transmission shaft, a spray jet head or a grinding head.

In the preferred embodiments of the invention, the plurality of support frames are arranged as pairs of the support frames, each pair comprising two support frames positioned in mutual alignment on the opposite longitudinal sides of the main suspension beam, and the pairs of support frames are serially positioned along the main suspension beam.

In some embodiments of the invention, the vertical distance of the base mechanisms of the support frames from the main suspension beam varies along the plurality of support frames.

In the preferred embodiments of the invention, each base mechanism is adapted to be detachably clamped to a respective clamp device fitted to the wind turbine blade mould.

In the preferred embodiments of the invention, the base mechanism of the support frame comprises a leg part, a foot part in the form of a flange extending laterally from the leg part, a shaft extending downwardly from the foot part and at least one pin extending laterally from the shaft, wherein the at least one pin is configured to be engaged by a hooked clamp member of a respective clamp device fitted to the wind turbine blade mould.

In use, the apparatus for the automatic manufacturing of wind turbine blades according to the preferred embodiments of the invention is mounted above, and onto, a wind turbine blade mould. The wind turbine mould comprises an elongate mould body having opposite longitudinal outer sides. A plurality of clamp devices are fitted to the wind turbine blade mould along the opposite longitudinal outer sides, and the base mechanism of each support frame is detachably clamped to a respective clamp device. Typically, the clamp devices are fixed to the opposite longitudinal outer sides of the wind turbine blade mould.

In the preferred embodiments of the invention, each clamp device comprises a hooked clamp member which, in a clamped configuration, is hooked over the at least one pin of the base mechanism of the respective support frame to detachably clamp the respective support frame to the wind turbine blade mould.

Preferably, each clamp device further comprises a main body which is fitted to the wind turbine blade mould, a support assembly which extends upwardly from the main body and comprises a pair of opposite support members having a vertical slot therebetween, the slot extending across the width of the support assembly to form at least one slot opening, and wherein the support members define an upper bearing surface.

Preferably, in the clamped configuration, the base mechanism of each support frame is detachably clamped to the respective clamp device by resting the foot part on the upper bearing surface, the shaft extends downwardly into the vertical slot and the at least one pin extends laterally out of a respective slot openings at a lower end of the respective slot opening.

In the preferred embodiments of the invention, each clamp device further comprises an actuator for moving the hooked clamp member between the clamped configuration and an unclamped configuration in which hooked clamp member is disengaged from the at least one pin of the base mechanism of the respective support frame.

In some embodiments of the invention, the opposite longitudinal outer sides of the wind turbine blade mould vary in height along the length of the wind turbine blade mould. The height of the clamp devices and the corresponding respective base mechanisms clamped thereto vary in height along the length of the wind turbine blade mould, the support frames vary in length along the length of the wind turbine blade mould, and the main suspension beam is horizontal.

In some embodiments of the invention, at least two of the tool supports are serially mounted above, and along the length of, the wind turbine blade mould. The height of the main suspension beam of at least one of the tool supports may be different from the height of the main suspension beam of at least one other of the tool supports.

In some embodiments of the invention, the wind turbine blade mould has a central longitudinal axis which is linear in a horizontal direction and the main suspension beam has a linear shape in the horizontal direction which is longitudinally aligned with the wind turbine blade mould.

Alternatively, in some other embodiments of the invention, the wind turbine blade mould has a central longitudinal axis which is non-linear in a horizontal direction and the main suspension beam has a non-linear shape in the horizontal direction which matches the non-linear shape of the wind turbine blade mould, and the main suspension beam is longitudinally aligned with the wind turbine blade mould.

The apparatus of the invention can be used in a method for the automatic manufacturing of wind turbine blades, the method comprising the steps of:

(a) mounting a tool support above a wind turbine blade mould, wherein the tool support is elongate in a longitudinal direction so as to extend longitudinally along at least a portion of a length of the wind turbine blade mould, wherein the elongate tool support comprises a main suspension beam which is elongate in the longitudinal direction, a support assembly which is detachably fitted to the wind turbine blade mould and supports the main suspension beam above the wind turbine blade mould, a tool holder slidably arranged on the main suspension beam and a tooling component detachably fitted to the tool holder;

(b) operating a drive mechanism to move the tool holder longitudinally along the main suspension beam to position the tooling component at a desired longitudinal position relative to the wind turbine blade mould;

(c) operating the tool holder to move the tooling component controllably within a three-dimensional co-ordinate system to a desired position relative to a surface of the wind turbine blade mould; and (d) operating the tooling component, under control of the tool holder, to perform a desired action over the wind turbine blade mould during a wind turbine blade manufacturing procedure.

Beneficial Effects:

The apparatus for the automatic manufacturing of wind turbine blades according to the preferred embodiments of the invention can provide a number of advantages as compared to the existing technology, either manual manufacturing or the known automated systems as summarized above. For example:

1. The apparatus can be used in combination with the main and small moulds of different blades, and has a strong versatility.

2. The apparatus is easy to install by a crane directly lifting the apparatus onto a blade mould.

3. The apparatus can guarantee the processing accuracy by digitally controlling the X, Y and Z coordinates of a tooling component in three-dimensional space relative to a wind turbine blade mould.

4. The apparatus can accurately and repeatedly integrate successive actions to be taken with respect to specific locations along a wind turbine blade mould, for example by grinding, spraying and material handling steps.

5. The apparatus can be incorporated into a large scale automated production line for manufacturing wind turbine blade and can operate at high efficiency and accuracy.

6. By providing a tool holder to which various different tooling components may be connected, for example by providing grinding and spraying heads, typically combined with sensors and pipelines for supplying liquid to be sprayed or a vacuum to remove ground waste material, the apparatus can replace different working components according to the process requirements, which ensure the flexibility and convenience of the wind turbine blade manufacture.

7. By replacing current manual manufacturing equipment with the apparatus of the invention, the apparatus can improve the working efficiency, accuracy and safety of the working environment.

8. The automatic manufacturing apparatus can be less bulky, less complicated and less expensive than known automatic manufacturing systems.

BRIEF DESCRIPTION OF THE DRAWINGS

Embodiments of the invention will now be described by way of example only with reference to the accompanying drawings, in which.

DETAILED DESCRIPTION

FIGS. 1 to 7 illustrate a first preferred embodiment of an apparatus for the automatic manufacturing of wind turbine blades in accordance with the invention.

Figure 1:
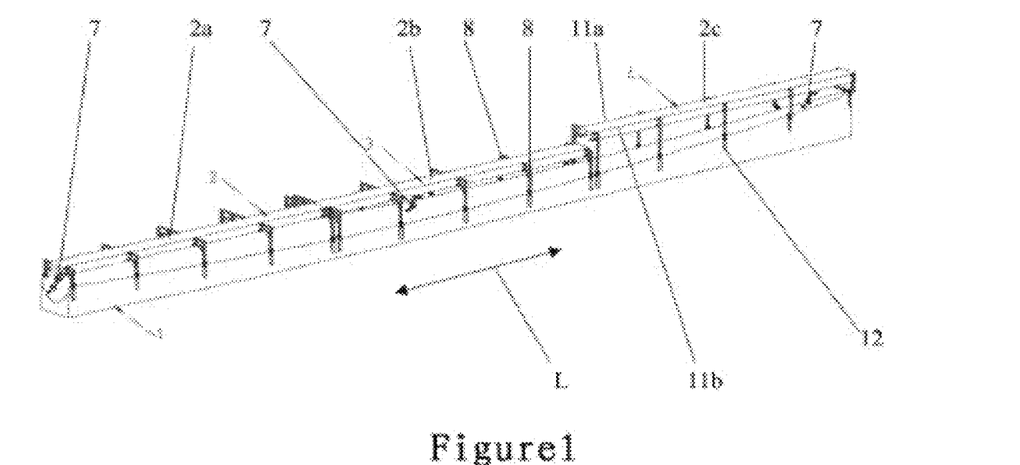
FIG. 1 is a schematic perspective side view of an apparatus for the automatic manufacturing of wind turbine blades in accordance with an embodiment of the invention, the apparatus being installed on a wind turbine blade mould.
Figure 2:
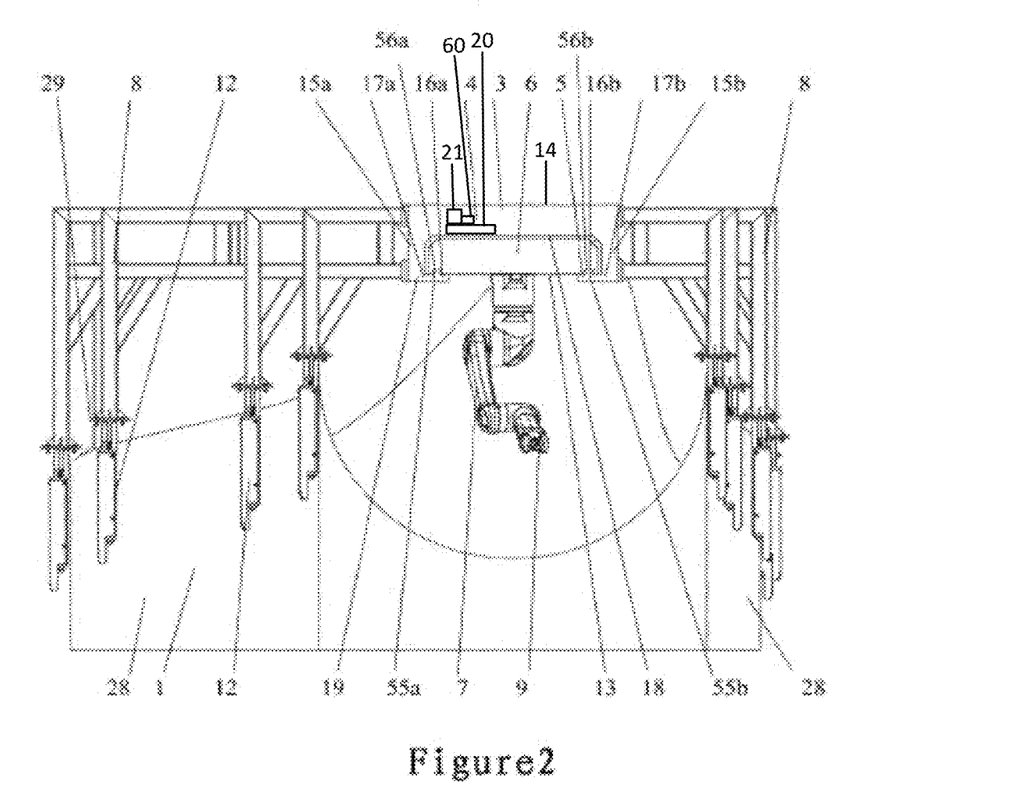
FIG. 2 is a schematic perspective end view of the apparatus of FIG. 1 installed on the wind turbine blade mould.
Figure 3:
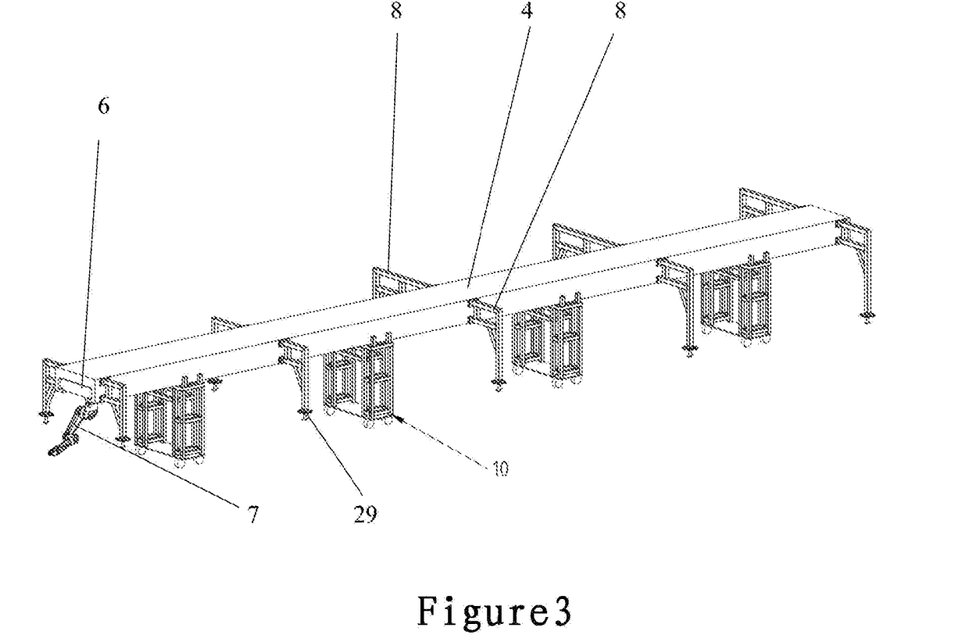
FIG. 3 is a schematic perspective side view of the apparatus of FIG. 1 prior to being installed on a wind turbine blade mould, the apparatus being temporarily stored on a plurality of storage frames.

Referring to FIGS. 1 and 2, the apparatus comprises a plurality of tool supports (2), identified in the Figures by tool supports (2*a*, 2*b*, 2*c*), each of which is adapted to be detachably mounted above a wind turbine blade mould (1). In the illustrated embodiment, the wind turbine blade mould (1) is provided with a series of longitudinally aligned individual tool supports (2*a*, 2*b*, 2*c*), each tool support (2) being arranged for the automatic manufacture of a respective portion of the wind turbine blade within the common wind turbine blade mould (1). In FIGS. 1 and 2 each tool support (2) is mounted above, and long the length of, the wind turbine blade mould (1). FIG. 3 shows one of the tool supports (2) when temporarily stored on a plurality of storage trolleys (10) before or after installation of the apparatus onto the wind turbine blade mould (1).

Each tool support (2) is elongate in a longitudinal direction (L) so as to extend longitudinally along at least a portion of a length of the wind turbine blade mould (1) when the tool support (2) is mounted above the wind turbine blade mould (1).

The apparatus may comprises a single tool support (2). However, in the illustrated embodiment, the wind turbine blade mould (1) can be very long, for example more than 80 meters, and consequently optionally the apparatus may comprise at least two of the tool supports (2) which are serially mounted above, and along the length of, the wind turbine blade mould (1). For example according to the shape and dimensions of the wind turbine blade mould (1), a respective one of three tool supports (2*a*, 2*b*, 2*c*), each matching the shape of the wind turbine blade mould (1) is respectively placed at the root, middle and tail parts of the wind turbine blade mould (1) respectively, as shown in FIG. 1. As described further hereinbelow, each of the three tool supports (2*a*, 2*b*, 2*c*) comprise a respective tool holder and drive mechanism therefor.

The, or each, elongate tool support (2) comprises a main suspension beam (4) which is elongate in the longitudinal direction (L).

An elongate guide rail (5) is provided on the main suspension beam (4) so as to extend longitudinally along the main suspension beam (4). A slider base (6) is slidably mounted on the guide rail (5).

The main suspension beam (4) has a "C" shaped cross-section with a downwardly-oriented opening (13) thereby to define the guide rail (5). In the illustrated embodiment, the main suspension beam (4) comprises an upper wall (3), two opposite side walls (15*a*, 15*b*) depending downwardly from the upper wall (14) and two opposite flanges (16*a*, 16*b*) extending inwardly towards each other at opposite lower edges (17*a*, 17*b*) of the opposite side walls (15*a*, 15*b*). This shape and configuration of the main suspension beam (4) defines an elongate channel (18) extending along a lower face (19) of the main suspension beam (4). A pair of opposed longitudinal rail members (55*a*, 55*b*) is provided on the pair of opposite flanges (16*a*, 16*b*) and each rail member (55*a*, 55*b*) is located in a respective longitudinal slot (56*a*, 56*b*) in the slider base (6), typically by a bearing assembly (not shown) to permit low friction sliding of the slider base (6) along the guide rail (5). Each rail member (55*a*, 55*b*) may be T-shaped and fitted into a respective T-shaped slot (56*a*, 56*b*).

The slider base (6) is captively fitted in the channel (18) for slidable movement therealong. Preferably, the slider base (6) has an outer cross-section which matches an outer cross-section of the channel (18). Accordingly, the slider base (6) matches the contact surface of the main suspension beam (4) to ensure the stability and reliability of a tooling component (9) mounted on the slider base (6) as described further hereinbelow.

There is also provided a drive mechanism for driving the slider base (6) longitudinally along the guide rail (5). The drive mechanism comprises a mechanical transmission fitted between the main suspension beam (4) and the slider base (6). An electric motor is coupled to the mechanical transmission. Typically, the mechanical transmission is a chain transmission, a gear transmission or a worm gear transmission. For example, a gear wheel or worm wheel is arranged on the slider base (6) and respectively engages an elongate gear element, rack or worm screw arranged on the main suspension beam (4).

Rotation of the gear wheel or worm wheel under the action of the electric motor drives the slider base (6) longitudinally along the guide rail (5). Preferably, the electric motor incorporates a braking mechanism for automatically decelerating the slider base (6) when the electric motor is switched from a powered state to an unpowered state.

Figure 5:
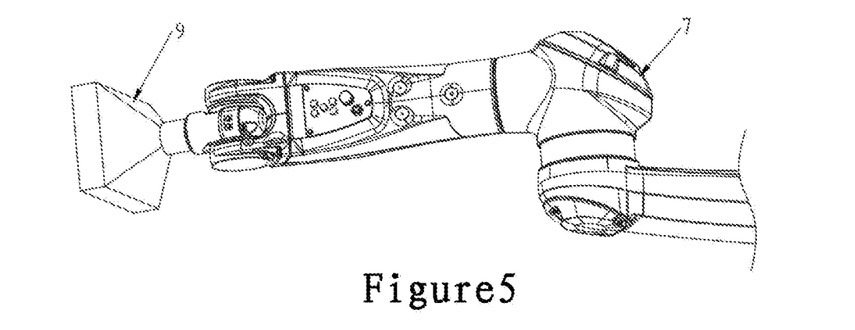
FIG. 5 is a schematic perspective view of a tool holder and a tooling component in the apparatus of FIG. 1.

A tool holder (7) is mounted on the slider base (6). Referring to FIG. 5, the tool holder (7) is adapted to be fitted, at the end face of the tool holder (7), with a tooling component (9), for example a mechanical manipulator device, a rotatable transmission shaft, a spray jet head or a grinding head. The tooling component (9) is detachably connected to the tool holder (7).

The tool holder (7) can be manipulated in a three dimensional co-ordinate space. The position of the tool holder (7), and the associated tooling component (9) detachably connected thereto, can be independently controlled, typically digitally, respectively in three orthogonal directions, X, Y and Z, wherein typically X and Y correspond to a horizontal plane and Z corresponds to a vertical direction, to ensure that each action carried out by the tooling component (9) is at the desired location and angle with respect to the mould surface, for example an angle of grinding or spraying is perpendicular to the mould surface.

The tooling component (9) can be replaced by different tooling components (9) according to the requirements of different processes to realize various functions. For example, a grinding head incorporating a pressure sensor and a vacuum pipeline can be provided as the tooling component (9) for a grinding application. A spray head for spraying a liquid jet can be provided as the tooling component (9) for a spraying application. Heavy hooks can be provided as the tooling component (9) to facilitate the lifting of glass fibre or core materials during layup of materials into the mould.

FIGS. 8 to 12 illustrate a second preferred embodiment of an apparatus for the automatic manufacturing of wind turbine blades in accordance with the invention.

Referring to FIGS. 8 to 12, the main suspension beam (4) is modified as compared to the first embodiment. In particular, the main suspension beam (4) comprises a pair of suspension beam members (104a, 104b) which are elongate in the longitudinal direction (L) and spaced from each other in a direction transverse to the longitudinal direction. The suspension beam members (104a, 104b) are mounted on a framework (108).

In the embodiment of FIGS. 8 to 12, each support frame (8) abuts the framework (108), and the support frames have essentially the same structure and configuration as described above for the first embodiment.

The slider base (6) is also modified as compared to the first embodiment. In particular, the slider base (6) comprises a central body (150) and, on opposite sides (152a, 152b) of the central body (150), a pair of mount assemblies (166a, 166b). Each mount assembly (166a, 166b) is supported on a respective suspension beam member (104a, 104b).

Figure 10:
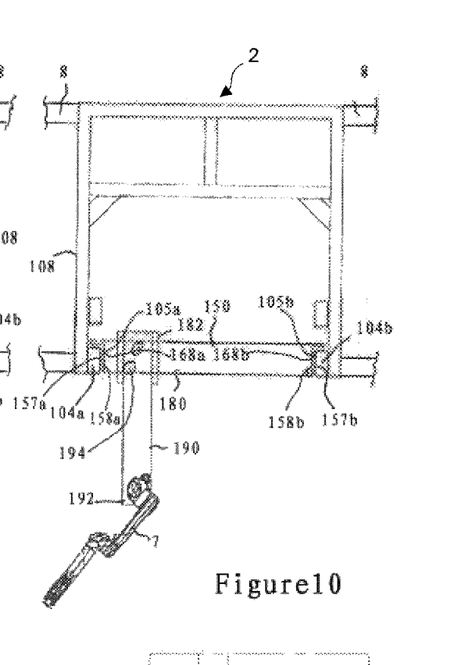
FIG. 10 is a schematic end view of the apparatus of FIG. 8 with the tool holder of the apparatus being positioned in a third configuration.
Figure 11:
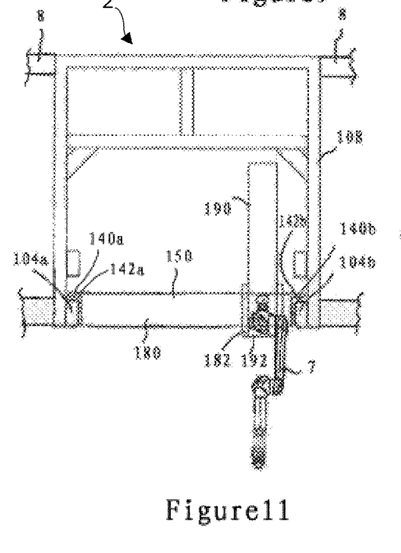
FIG. 11 is a schematic end view of the apparatus of FIG. 8 with the tool holder of the apparatus being positioned in a fourth configuration.
Figure 12:
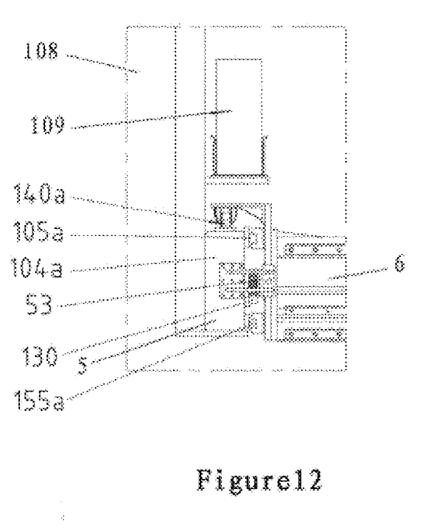
FIG. 12 is a schematic enlarged end view of part of the apparatus of FIG. 8 showing in greater detail the construction of an elongate guide rail on a main suspension beam, a slider base slidably mounted on the guide rail and a drive mechanism for driving the slider base along the main suspension beam.

FIG. 12 shows in greater detail the construction of the elongate guide rail (5) on the main suspension beam (4) and the slider base (6), and although only the left-hand side of the apparatus of FIGS. 8 to 11 is enlarged in FIG. 12, the same construction, but in a mirror-image configuration, is also provided on the right-hand side of the apparatus of FIGS. 8 to 11.

The guide rail (5) comprises a pair of first guide rail members (105a, 105b). Each first guide rail member (105a, 105b) is mounted on a longitudinally-extending side face (157a, 157b) of a respective suspension beam member (104a, 104b). Each mount assembly (166a, 166b) comprises a respective first guide element (168a, 168b) which engages with a respective first guide rail member (105a, 105b). Each first guide element (168a, 168b) is mounted on a respective opposing side face (158a, 158b) of the slider base (6). Typically, the first guide element (168a, 168b) is a roller having a horizontal axis, and is received in a slot within the respective first guide rail member (105a, 105b).

The guide rail (5) further comprises a pair of second guide rail members (155a, 155b). Each second guide rail member (155a, 155b) is mounted on the longitudinally-extending side face (157a, 157b) of respective suspension beam member (104a, 104b). Each mount assembly (166a, 166b) comprises a respective second guide element (178a, 178b) which engages with a respective second guide rail member (155a, 155b). Each second guide element (178a, 178b) is mounted on the respective opposing side face (158a, 158b) of the slider base (6), Each second guide rail member (155a, 155b) is parallel to and spaced from the first guide rail member (105a, 105b) which is mounted on the same respective suspension beam member (104a, 104b) as the said second guide rail member (155a, 155b). Typically, the second guide element (178a, 178b) is a roller having a horizontal axis, and is received in a slot within the respective second guide rail member (155a, 155b).

Each mount assembly (166a, 166b) further comprises a respective movable support element (140a, 140b) which extends downwardly and movably engages an upwardly-oriented support surface (142a, 142b) on the respective suspension beam member (104a, 104b). In this embodiment, the movable support element (140a, 140b) comprises a wheel. However, a slider may alternatively be provided.

The drive mechanism (53) for driving the slider base (6) longitudinally along the guide rail (5) may be configured as for the first embodiment. For example, as shown in FIG. 12, an elongate gear element (130) is provided in a recess (132) in one or both of the suspension beam members (104a, 104b) and a drive wheel (134), driven by an electric motor (not shown), is coupled to the elongate gear element (130). Other mechanical transmissions may be employed, as described above for the first embodiment.

The central body (150) of the slider base (6) comprises a lateral beam (180). The tool holder (7) is mounted on the central body (150) by a transversely movable support (182) which is configured to be movable along the lateral beam (180). The transversely movable support (182) comprises a first drive device (186) for driving the transversely movable support (182) along the lateral beam (180).

The transversely movable support (182) also comprises a mount (188), which is fitted to the lateral beam (180) to be movable along the lateral beam (180). An arm member (190) is fitted to the mount (188) to be movable in a direction transverse to the lateral beam (180). The arm member (190) has a lower end (192) to which the tool member (7) is fitted. The transversely movable support (182) comprises a second drive device (194) for driving the arm member (190) upwardly or downwardly relative to the lateral beam (180).

In this embodiment, there is also a controller (198) for controlling the position of the tool member (7), fitted to the lower end (192) of the arm member (190) with respect to a three-dimensional co-ordinate system, by controlling, typically wirelessly the drive mechanism (53), the first drive device (186) and the second drive device (194).

One or more cable trays (109) may be fitted to the framework (108) to carry cables for providing an electrical power supply to the drive mechanism (53), the first drive device (186) and the second drive device (194).

Figure 8:
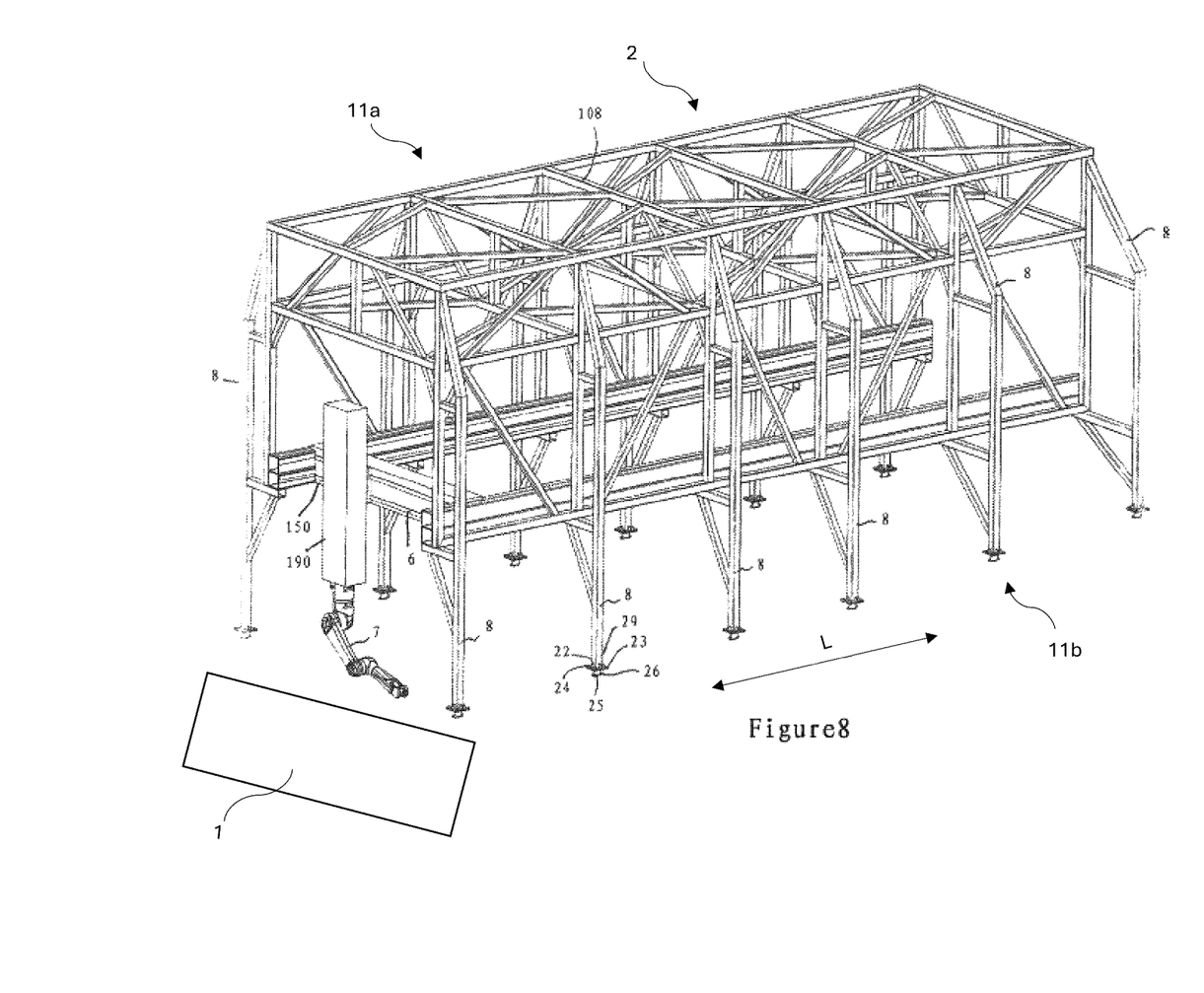
FIG. 8 is a schematic perspective view of an apparatus for the automatic manufacturing of wind turbine blades in accordance with a second embodiment of the invention, with the tool holder of the apparatus being positioned in a first configuration.
Figure 9:
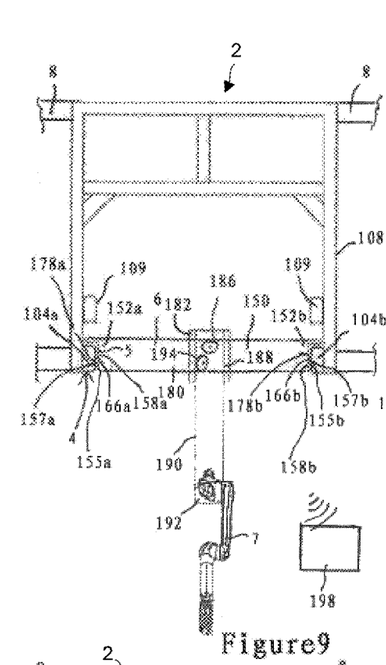
FIG. 9 is a schematic end view of the apparatus of FIG. 8 with the tool holder of the apparatus being positioned in a second configuration.

As can be seen from FIGS. 8 to 11, the first drive device (186) and the second drive device (194) can be independently operated by the controller (198) so that the tool member (7) may be independently moved transversely laterally relative to a wind turbine blade mould (not shown) beneath the tool member (7) and raised or lowered relative to the wind turbine blade mould. FIG. 8 show the tool member (7) in a central middle-height position, FIG. 9 shows the tool member (7) in a central lowered position, FIG. 10 shows the tool member (7) in a left-side lowered position and FIG. 11 shows the tool member (7) in a left-side raised position.

In addition, as shown by FIGS. 8 to 11, the orientation of the tool member (7) relative to the arm (190) can also be controlled by a further drive device (not shown) in the tool member (7). Furthermore, the drive mechanism (53) moves the tool member (7) longitudinally relative to the wind turbine blade mould. Consequently, the tool member (7) can be readily and controllably positioned at any location in a three-dimensional co-ordinate system relative to the wind turbine blade mould.

In the illustrated first and second embodiments of the invention, the wind turbine blade mould (1) has a central longitudinal axis which is linear in a horizontal direction and the main suspension beam (4) has a linear shape in the horizontal direction which is longitudinally aligned with the wind turbine blade mould (1). Correspondingly, the tool holder (7) mounted on the slider base (6) can be driven up or down a straight line extending along the length, or a portion of the length, of the wind turbine blade mould (1).

However, in alternative embodiments, the wind turbine blade mould may have a central longitudinal axis which is non-linear in a horizontal direction and correspondingly the main suspension beam has a non-linear shape in the horizontal direction which matches the non-linear shape of the wind turbine blade mould, and the main suspension beam is longitudinally aligned with the wind turbine blade mould. In each of the first and second embodiments of the invention, the main suspension beam (4) is supported above the wind turbine blade mould (1) by a plurality of support frames (8) fitted to the main suspension beam (4). The plurality of support frames (8) is provided as a series of support frames (8) positioned along the length of the main suspension beam (4) on opposite longitudinal sides (11a, 11b) of the main suspension beam (4).

In the illustrated embodiments, the plurality of support frames (8) are arranged as pairs of the support frames (8), each pair comprising two support frames (8) positioned in mutual alignment on the opposite longitudinal sides (11a, 11b) of the main suspension beam (4), and the pairs of support frames (8) are serially positioned along the main suspension beam (4). By providing the support frames (8) in pairs, this configuration facilitates the lifting of the tool support (2) by use of a crane in order to position the tool support (2) over, and detach the tool support (2) from, the wind turbine blade mould (1).

In the embodiment of FIGS. 1 to 7 each support frame (8) abuts the main suspension beam (4) and so each support frame (8) buttresses the support frame (8) and functions as a butt frame. In the embodiment of FIGS. 8 to 12, each support frame (8) abuts the framework (108) to which the pair of suspension beam members (104a, 104b) are mounted.

As shown in FIG. 2 and FIG. 8, each support frame (8) comprises a base mechanism (29) adapted to be clamped to a respective clamp device (12) fitted to the wind turbine blade mould (1).

Figure 4A:
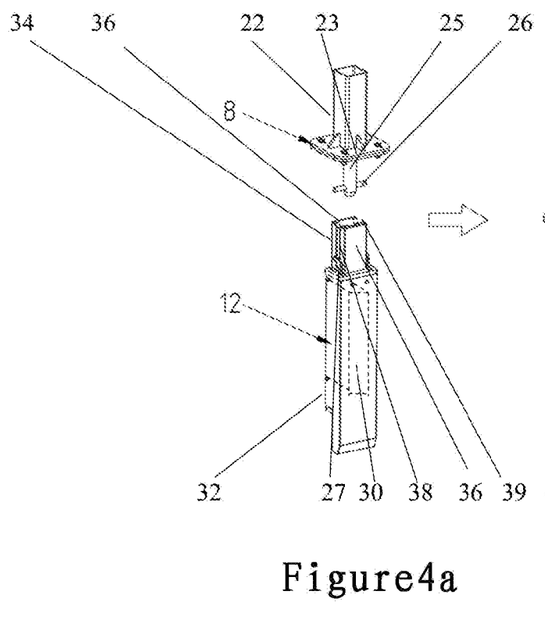
FIGS. 4a and 4b are schematic perspective side views of a base mechanism of a support frame of the apparatus of FIG. 1 respectively when unclamped and when clamped to a respective clamp device fitted to the wind turbine blade mould.
Figure 4B:
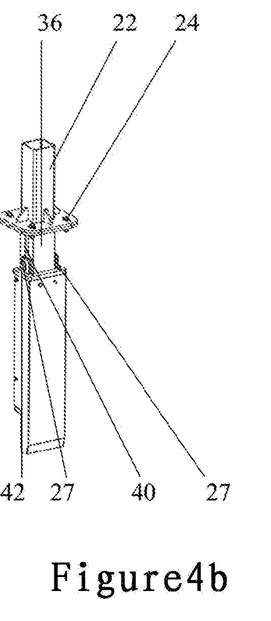

Referring also to FIGS. 4a and 4b, which respectively show the base mechanism (29) in an unclamped configuration and a clamped configuration, the base mechanism (29) of the support frame (8) comprises a leg part (22) and a foot part (23) in the form of a flange (24) extending laterally from the leg part (22). Typically, the flange (24) is an annular flange which surrounds the leg part (22), although as illustrated the flange (24) may have a polygonal outer edge, for example a square outer edge.

A shaft (25) extends downwardly from the foot part (23) and at least one pin (26) extends laterally from the shaft (25). In the illustrated embodiment, two pins (26) are axially aligned and extend from opposite sides of the shaft (25). The at least one pin (26) is configured to be engaged by a hooked clamp member (27) of a respective clamp device (12) fitted to the wind turbine blade mould (1).

The wind turbine blade mould (1) comprises an elongate mould body having opposite longitudinal outer sides (28). A plurality of clamp devices (12) are fitted in a spaced arrangement to the wind turbine blade mould (1) along the opposite longitudinal outer sides (28). Preferably, the clamp devices (12) are fixed to the opposite longitudinal outer sides (28) of the wind turbine blade mould (1).

The base mechanism (29) of each support frame (8) is detachably clamped to a respective clamp device (12).

Referring again to FIGS. 4a and 4b, each clamp device (12) comprises a main body (32) which is fitted to the wind turbine blade mould (1). A support assembly (34) extends upwardly from the main body (32) and comprises a pair of opposite support members (36) having a vertical slot (38) therebetween. The support members (36) define an upper bearing surface (39). The slot (38) extends across the width of the support assembly (34) to form two opposed slot openings (40).

Each clamp device (12) further comprises at least one hooked clamp member (27) which, in a clamped configuration, is hooked a respective pin (26) of the base mechanism (29) of the respective support frame (8) to detachably clamp the respective support frame (8) to the wind turbine blade mould (1). In the illustrated embodiment, two hooked clamp members (27) are provided, each hooked clamp member (27) being adjacent to a lower end (42) of a respective slot opening (40). In the clamped configuration, each hooked clamp member (27) is hooked over a respective pin (26) of the base mechanism (29).

Each clamp device (12) further comprises an actuator (30), shown in phantom in FIG. 4a, located within the main body (32) for moving the hooked clamp member (27) between the clamped configuration and an unclamped configuration in which hooked clamp member (27) is disengaged from the at least one pin (26) of the base mechanism (29) of the respective support frame (8). In the illustrated embodiment, the hooked clamp member (27) is rotated by the actuator (30) in an anticlockwise direction from a retracted unclamped configuration to an upwardly extended clamped configuration. The actuator (30) may be hydraulically or electrically actuated.

The base mechanism (29) of each support frame (8) is detachably clamped to the respective clamp device (12) by resting the foot part (23) on the upper bearing surface (39). The shaft (25) extends downwardly into the vertical slot (38) and the pins (26) each extend laterally out of the respective slot openings (40) at the lower end (42) of the respective slot opening (40).

The actuator (30) is operated so that each hooked clamp member (27) is rotated and thereby engaged with the respective pin (26) in a hooked-over configuration so that the base mechanism (29) of the respective support frame (8) is securely clamped to the clamp device (12) and thereby to the wind turbine blade mould (1).

In the illustrated embodiments, the opposite longitudinal outer sides (28) of the wind turbine blade mould (1) vary in height along the length of the wind turbine blade mould (1). To accommodate such height variation, the vertical distance of the base mechanisms (29) of the support frames (8) from the main suspension beam (4) can vary along the plurality of support frames (8).

In the illustrated embodiments, the height of the clamp devices (12) and the corresponding respective base mechanisms (29) clamped thereto vary in height along the length of the wind turbine blade mould (1). In addition, the support frames (8) vary in length along the length of the wind turbine blade mould (1). However, the main suspension beam (4) is preferably horizontal.

The height and dimension of the base mechanism (29) of each support frame (8) is provided according to the respective wind turbine blade mould (1) so that the tooling component (9) located at the desired height and orientation relative the mould surface.

As shown in FIGS. 1, 2 and 4, the base mechanism (29) of each support frame (8) is installed at the position corresponding to the respective clamp device (12) on the longitudinal edge of the mould (1). The height dimension of the base mechanism (29) is adjusted according to different wind turbine blade moulds so that any tooling component (9) connected to the tool holder (7) can fully and accurately contact the mould surface during the associated action, for example grinding.

Typically, each support frame (8) is configured so as to be extendable, for example by providing a telescoping assembly in the support frame (8), so that the respective base mechanism (29) can be positioned at a desired height relative to the wind turbine blade mould (1).

In an embodiment where the opposite longitudinal outer sides (28) of the wind turbine blade mould (1) can vary in height along the length of the wind turbine blade mould (1), preferably the height of the main suspension beam (4) of at least one of the tool supports (2) is different from the height of the main suspension beam (4) of at least one other of the tool supports (2).

In other words, the wind turbine blade mould (1) can be provided with a series of individual tool supports (2), each tool support (2) being arranged for the automatic manufacture of a respective portion of the wind turbine blade within the common wind turbine blade mould (1). By providing a plurality of tool supports (2), correspondingly there is provided a plurality of main suspension beams (4), and the shape and dimensions of the assembly of the plural main suspension beams (4) can be configured to substantially match the surface of the wind turbine blade mould (1), typically by providing different sizes of the main suspension beams (4) which are located at different positions along the length of the mould (1).

In order to use the apparatus, the tool supports (2) are positioned over the wind turbine blade mould (1) as shown in FIGS. 1 and 2 so that each base mechanism (29) is clamped within a respective clamp device (12). Then the tool holder (7) is sequentially provided with one or more tooling components (9). The tooling component (9) is driven by the drive mechanism (53) along the respective guide rail (5) to a desired longitudinal position, and then the tooling component (9) is operated automatically, for example by pre-programming or by remote control, by moving the tooling component (9) in the three-dimensional co-ordinate system to perform a desired action over the wind turbine blade mould (1) during a wind turbine blade manufacturing procedure.

After the completion of the task of automated manufacturing, as shown in FIG. 3, a crane is used to lift each tool supports (2) onto the storage trolleys (10) in an equipment placement area of a manufacturing facility. A crane hook is used to apply a hook-lifting force onto one or more of the support frames 8. The tool support (2) can be subsequently lifted onto the same or a different wind turbine blade mould (1) for use during a subsequent wind turbine blade manufacturing procedure. The plurality of storage trolleys (10) is very convenient to temporarily support the tool support (2) and the associated tool holder (7) and any tooling component (9) connected thereto, constituting an entire set of automated manufacturing equipment, so that the entire set of automated manufacturing equipment can be moved from one workshop to another workshop in the absence of overhead traveling cranes or truck cranes.

Figure 6:
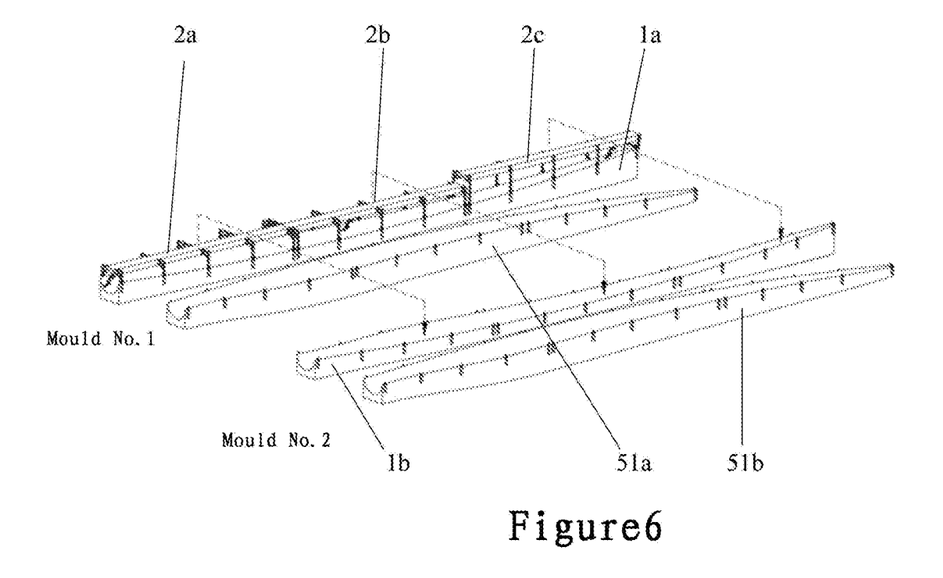
FIG. 6 is a schematic perspective side view of the apparatus of FIG. 1 installed on a first wind turbine blade mould and showing transfer of the apparatus to a second wind turbine blade mould in a first, lateral, transfer arrangement.
Figure 7:
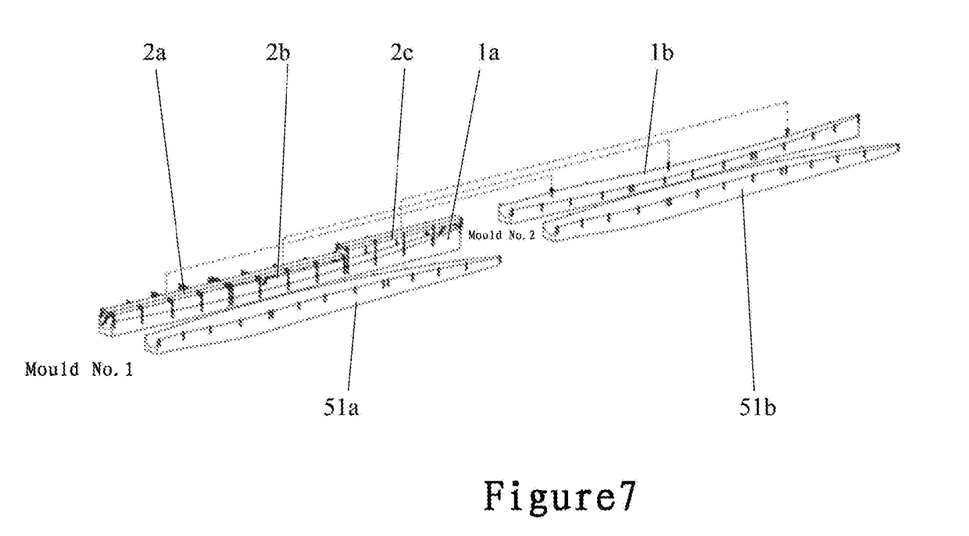
FIG. 7 is a schematic perspective side view of the apparatus of FIG. 1 installed on a first wind turbine blade mould and showing transfer of the apparatus to a second wind turbine blade mould in a second, longitudinal, transfer arrangement.

In the case of multiple sets of the same type of wind turbine blade mould (1), a production pipeline for automated operation can be realized. As shown in FIG. 6, the same type of mould, i.e. having the same shape and dimensions, can be arranged laterally, or as shown in FIG. 7, the same type of mould can be arranged longitudinally. After the production of No. 1 mould (1a) has been completed, the blade can be further manufactured by craning the tool supports (2) to No. 2 mould (1b). At the same time, No. 1 mould 1a can also be implemented with the next production process to save the working time and improve the working efficiency. The opposite moulds (51a, 51b) to the two moulds (1a, 1b) can be sequentially provided with a respective set of the tool supports (2) which is configured to match the opposite moulds (51a, 51b).

The above embodiments only illustrate the technical concept and characteristics of the invention. The purpose of the invention is to enable those skilled in the technical field to understand and implement the content of the invention, and not to limit the scope of protection of the invention. Any equivalent transformation or modification made in accordance with the spiritual essence of the invention shall be covered within the scope of protection of the invention.

The invention claimed is:

1. An apparatus comprising a tool support (2) adapted to be mounted above a wind turbine blade mould (1), wherein the tool support (2) is elongate in a longitudinal direction (L) and adapted to extend longitudinally along at least a portion of a length of the wind turbine blade mould (1) when the tool support (2) is mounted above the wind turbine blade mould (1), wherein the elongate tool support (2) comprises a main suspension beam arrangement (4) which is elongate in the longitudinal direction (L), a plurality of support frames (8) fitted to the main suspension beam arrangement (4) for supporting the main suspension beam arrangement (4) above the wind turbine blade mould (1), the plurality of support frames (8) being provided as a series of support frames (8) positioned along the length of the mains suspension beam arrangement (4) on opposite longitudinal sides (11a, 11b) of the main suspension beam arrangement (4), each support frame (8) abutting a framework (108) and each support frame (8) comprising a base mechanism (29) adapted to be detachably fitted to the wind turbine blade mould (1), an elongate guide rail assembly (5) provided on the main suspension beam arrangement (4) so as to extend longitudinally along the main suspension beam arrangement (4), a slider base (6) slidably mounted on the guide rail assembly (5), a drive mechanism (53) for driving the slider base (6) longitudinally along the guide rail assembly (5) and a tool holder (7) mounted on the slider base (6), wherein the main suspension beam arrangement (4) comprises a pair of suspension beam members (104a, 104b) mounted on the framework (108) and which are elongate in the longitudinal direction (L) and spaced from each other in a direction transverse to the longitudinal direction, and the slider base (6) comprises a central body (150), each suspension beam of the pair of suspension beam members (104a, 104b) being separate from each other and mounted on opposite sides (152a, 152b) of the central body (150), a pair of mount assemblies (166a, 166b), each mount assembly (166a, 166b) being supported on a respective suspension beam member (104a, 104b).

2. An apparatus according to claim 1, wherein the guide rail assembly (5) comprises a pair of first guide rail members (105a, 105b), each first guide rail member (105a, 105b) being mounted on a respective suspension beam member (104a, 104b), and each mount assembly (166a, 166b) comprises a respective first guide element (168a, 168b) which engages with a respective first guide rail member (105a, 105b).

3. An apparatus according to claim 2, wherein each first guide rail member (105a, 105b) is mounted on a longitudinally-extending side face (157a, 157b) of the respective suspension beam member (104a, 104b), and each first guide element (168a, 168b) is mounted on a respective opposing side face (158a, 158b) of the slider base (6).

4. An apparatus according to claim 3, wherein the guide rail assembly (5) further comprises a pair of second guide rail members (155a, 155b), each second guide rail member (155a, 155b) being mounted on a respective suspension beam member (104a, 104b), and each mount assembly (166a, 166b) comprises a respective second guide element (178a, 178b) which engages with a respective second guide rail member (155a, 155b), wherein each second guide rail member (155a, 155b) of the pair of second guide rail members (155a, 155b) is parallel to and spaced from a respective first guide rail member (105a, 105b) of the pair of first guide rail members (105a, 105b) which is mounted on the same respective suspension beam member (104a, 104b) as the second guide rail member (155a, 155b).

5. An apparatus according to claim 4, wherein each second guide rail member (155a, 155b) of the pair of second guide rail members (155a, 155b) is mounted on a longitudinally-extending side face (157a, 157b) of the respective suspension beam member (104a, 104b), and each second guide element (178a, 178b) is mounted on a respective opposing side face (158a, 158b) of the slider base (6), wherein the first guide rail member (105a) is vertically spaced from the second guide rail member (155a) on the same suspension beam member (104a) and the first guide rail member (105b) is vertically spaced from the second guide rail member (155b) on the same suspension beam member (104b).

6. An apparatus according to claim 1, wherein each mount assembly (166a, 166b) further comprises a respective movable support element (140a, 140b) which extends downwardly and movably engages an upwardly-oriented support surface (142a, 142b) on the respective suspension beam member (104a, 104b).

7. An apparatus according to claim 6, wherein the movable support element (140a, 140b) comprises a wheel.

8. An apparatus according to claim 1, wherein the central body (150) of the slider base (6) comprises a lateral beam (180), and the tool holder (7) is mounted on the central body (150) by a transversely movable support (182) which is configured to be movable along the lateral beam (180).

9. An apparatus according to claim 8, wherein the transversely movable support (182) comprises a first drive device (186) for driving the transversely movable support (182) along the lateral beam (180).

10. An apparatus according to claim 8, wherein the transversely movable support (182) comprises a mount (188), which is fitted to the lateral beam (180) to be movable along the lateral beam (180), and an arm member (190) which is fitted to the mount (188) to be movable in a direction transverse to the lateral beam (180), wherein the arm member (190) has a lower end (192) to which the tool holder (7) is fitted.

11. An apparatus according to claim 10, wherein the transversely movable support (182) comprises a second drive device (194) for driving the arm member (190) upwardly or downwardly relative to the lateral beam (180).

12. An apparatus according to claim 10, further comprising a controller (198) for controlling the position of the tool holder (7), fitted to the lower end (192) of the arm member (190) with respect to a three-dimensional co-ordinate system, by controlling the drive mechanism (53), a first drive device (186) and a second drive device (194).

13. An apparatus according to claim 1, wherein the tool holder (7) is adapted to be fitted with a mechanical manipulator device, a rotatable transmission shaft, a spray jet head or a grinding head.

14. An apparatus according to claim 1, wherein the plurality of support frames (8) are arranged as pairs of the support frames (8), each pair comprising two support frames (8) positioned in mutual alignment on the opposite longitudinal sides (11a, 11b) of the main suspension beam arrangement (4), and the pairs of support frames (8) are serially positioned along the main suspension beam arrangement (4).

15. An apparatus according to claim 1, wherein the base mechanisms (29) comprises at least a first base mechanism on a first support frame of the support frames (8) and a second base mechanism on a second support frame of the support frames (8), a vertical distance of the first base mechanisms from the main suspension beam arrangement (4) being different from a vertical distance of the second base mechanism from the main suspension beam arrangement (4).

16. An apparatus according to claim 1, wherein each base mechanism (29) is adapted to be detachably clamped to a respective clamp device (12) of the wind turbine blade mould (1).

17. An apparatus according to claim 16, wherein each base mechanism of the base mechanisms (29) of the support frame (8) comprises a leg part (22), a foot part (23) in the form of a flange (24) extending laterally from the leg part (22), a shaft (25) extending downwardly from the foot part (23) and at least one pin (26) extending laterally from the shaft (25), wherein the at least one pin (26) is configured to be engaged by a hooked clamp member (27) of a respective clamp device (12) of the wind turbine blade mould (1).

18. A system comprising the apparatus according to claim 1 and the wind turbine blade mould of claim 1, the apparatus mounted above, and onto, the wind turbine blade mould (1), wherein the wind turbine blade mould (1) comprises an elongate mould body having opposite longitudinal outer sides (28), a plurality of clamp devices (12) are fitted to the wind turbine blade mould (1) along the opposite longitudinal outer sides (28), and the base mechanism (29) of each support frame (8) is detachably clamped to a respective clamp device (12).

19. A system according to claim 18, wherein the clamp devices (12) are fixed to the opposite longitudinal outer sides (28) of the wind turbine blade mould (1).

20. A system according to claim 18, wherein each base mechanism of the base mechanisms (29) is adapted to be detachably clamped to a respective clamp device (12) fitted to the wind turbine blade mould (1), the base mechanism (29) of each support frame (8) comprises a leg part (22), a foot part (23) in the form of a flange (24) extending laterally from the leg part (22), a shaft (25) extending downwardly from the foot part (23) and at least one pin (26) extending laterally from the shaft (25), and each clamp device (12) comprises a hooked clamp member (27) which, in a clamped configuration, is hooked over the at least one pin (26) of the base mechanism (29) of the respective support frame (8) to detachably clamp the respective support frame (8) to the wind turbine blade mould (1).

21. A system according to claim 20, wherein each clamp device (12) further comprises a main body (32) which is fitted to the wind turbine blade mould (1), a support assembly (34) which extends upwardly from the main body (32) and comprises a pair of opposite support members (36) having a vertical slot (38) therebetween, the slot (38) extending across the width of the support assembly (34) to form at least one slot opening (40), and wherein the support members (36) define an upper bearing surface (38).

22. A system according to claim 21, wherein in the clamped configuration, the base mechanism (29) of each support frame (8) is detachably clamped to the respective clamp device (12) by resting the foot part (23) on the upper bearing surface (38), the shaft (25) extends downwardly into the vertical slot (38) and the at least one pin (26) extends laterally out of a respective slot openings (40) at a lower end (42) of the respective slot opening (40).

23. A system according to claim 20, wherein each clamp device (12) further comprises an actuator (30) for moving the hooked clamp member (27) between the clamped configuration and an unclamped configuration in which hooked clamp member (27) is disengaged from the at least one pin (26) of the base mechanism (29) of the respective support frame (8).

24. A system according to claim 18, wherein the opposite longitudinal outer sides (28) of the wind turbine blade mould (1) vary in height along the length of the wind turbine blade mould (1), the height of the clamp devices (12) and the corresponding respective base mechanisms (29) clamped thereto vary in height along the length of the wind turbine blade mould (1), the support frames (8) vary in length along the length of the wind turbine blade mould (1), and the main suspension beam arrangement (4) is horizontal.

25. A system according to claim 24, wherein at least two of the tool supports (2) are serially mounted above, and along the length of, the wind turbine blade mould (1), and wherein the height of the main suspension beam arrangement (4) of at least one of the tool supports (2) is different from the height of the main suspension beam arrangement (4) of at least one other of the tool supports (2).

26. A system according to claim 18, wherein the wind turbine blade mould (1) has a central longitudinal axis which is linear in a horizontal direction and the main suspension beam arrangement (4) has a linear shape in the horizontal direction which is longitudinally aligned with the wind turbine blade mould (1).

27. A system according to claim 18, wherein the wind turbine blade mould (1) has a central longitudinal axis which is non-linear in a horizontal direction and the main suspension beam arrangement (4) has a non-linear shape in the horizontal direction which matches the non-linear shape of the wind turbine blade mould (1), and the main suspension beam arrangement (4) is longitudinally aligned with the wind turbine blade mould (1).

* * * * *

UNITED STATES PATENT AND TRADEMARK OFFICE
CERTIFICATE OF CORRECTION

PATENT NO. : 12,233,608 B2
APPLICATION NO. : 17/640542
DATED : February 25, 2025
INVENTOR(S) : Binjiang Chen et al.

Page 1 of 1

It is certified that error appears in the above-identified patent and that said Letters Patent is hereby corrected as shown below:

In the Claims

Claim 1, Column 14, Line 45 change mains to --main--

Signed and Sealed this
Twenty-fifth Day of March, 2025

Coke Morgan Stewart
*Acting Director of the United States Patent and Trademark Office*